William H. Bonnell's
Improvements in Lanterns.
REISSUED APR 11 1871
4331
Fig. I.
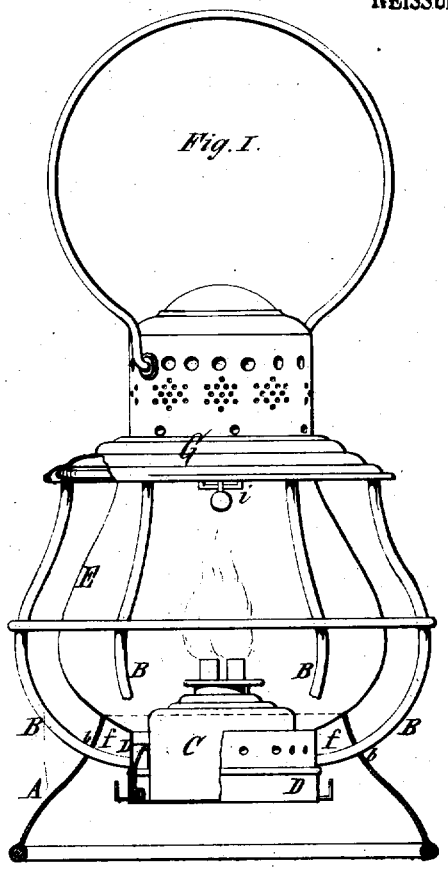
Fig. II.
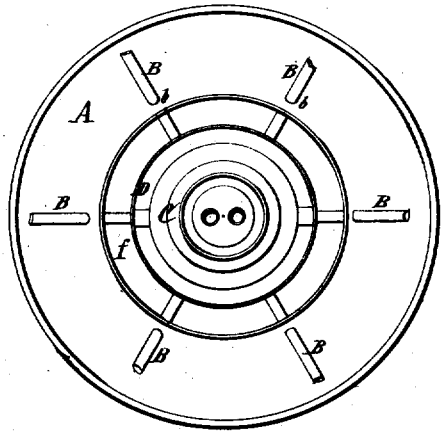
Jos. J. Somers
Jas. McCarty } Witnesses.
Wm. H. Bonnell Inventor.
by Jay Hyatt Atty.

United States Patent Office.

WILLIAM H. BONNELL, OF BUFFALO, NEW YORK, ASSIGNOR TO HIMSELF AND HORACE PARMELEE, OF SAME PLACE.

Letters Patent No. 96,772, dated November 16, 1869; reissue No. 4,331, dated April 11, 1871.

DIVISION A.

IMPROVEMENT IN LANTERNS.

The Schedule referred to in these Letters Patent and making part of the same.

I, WILLIAM H. BONNELL, of the city of Buffalo, in the county of Erie and State of New York, have invented certain Improvements in Lanterns, of which the following is a specification.

My invention relates to the manner of constructing the bases of a lantern.

The invention consists—

First, in the arrangement in a lantern of the supporting base-plate and a central burner so as to leave an annular opening between the said base plate and burner for the passage of light downward.

Second, in the arrangement in a lantern with a central lamp and a surrounding annular opening of a deflecting base-plate, which reflects the light radiating into the annular opening inward, so as to illumine the space under the center of the lamp.

Third, in the arrangement of the base-plate with the vertical wires of the guard, and the ring which supports the oil-reservoir, whereby the base-plate is sustained away from contact with said ring, as hereinafter described.

In the accompanying drawing—

Figure I is a sectional elevation of my improved lantern.

Figure II is a sectional plan of the base of the lantern with the glass-globe removed.

Like letters designate like parts in each of the figures.

A is the deflecting base-plate;

B B, the vertical wires of the guard or globe protector;

C, the oil-cup or reservoir;

D, the ring in which the latter is supported; and

E, the glass-globe arranged within the wire-guard, with its base fitting within the ring D and resting on the upper edge of the base-plate A.

The vertical wires B pass through holes *b* in the upper portion of the base-plate, and are secured to the ring D, as shown in Fig. I, whereby the base-plate is maintained in its relative position away from contact with the ring D, leaving an annular space, *f*, between them.

The rays of light entering this space and impinging against the inner and polished surface of the base-plate A are reflected inward, in accordance with the well-known law of optics, and made to converge until they meet at focuses underneath the center of the lantern, thereby illuminating the whole space, and preventing the body of the lamp and the base-plate from casting shadows, which are so objectionable.

G is the top or cap of the lantern, secured to the upper ring H of the wire guard by means of a hinge and a spring catch, *i*, which enables it to be turned back for removing the globe through the top of the guard.

What I claim as my invention is—

1. The arrangement in a lantern of the supporting base-plate A and a central burner, so as to leave an annular opening between the burner and base-plate for the transmission of the light downward, as hereinbefore set forth.

2. The arrangement in a lantern, and with a central lamp and surrounding annular opening *f*, of the deflecting base-plate A, which reflects the light inward, so as to illumine the space under the lamp, as hereinbefore set forth.

3. The arrangement in a lantern of the base-plate A, ring D, and vertical wires B, as hereinbefore set forth.

W. H. BONNELL.

Witnesses:
JNO. J. BONNER,
JAS. McCARTY.